United States Patent [19]

Wolkovitch

[11] 3,942,748
[45] Mar. 9, 1976

[54] APPARATUS FOR DISTANCE CONTROL

[76] Inventor: Julian Wolkovitch, 28603 Trailriders Drive, Rancho Palos Verdes, Calif. 90274

[22] Filed: Oct. 18, 1974

[21] Appl. No.: 515,886

Related U.S. Application Data

[63] Continuation of Ser. No. 351,307, April 16, 1973.

[52] U.S. Cl.............. 244/81; 73/178 T; 114/16 R
[51] Int. Cl.².......................................... B64C 25/32
[58] Field of Search......... 73/178 T, 384; 244/77 D, 244/81, 113, 1 TD, 82; 116/28 R; 40/215; 114/16 R

[56]     References Cited
        UNITED STATES PATENTS

| | | | |
|---|---|---|---|
| 1,908,408 | 5/1933 | Cox | 116/28 R |
| 1,919,089 | 7/1933 | Breguet et al. | 244/17.13 |
| 2,412,035 | 12/1946 | Dornak | 116/28 R |
| 2,873,075 | 2/1959 | Mooers et al. | 244/17.13 |
| 2,930,549 | 3/1960 | Ernst | 244/17.13 |

*Primary Examiner*—Donald O. Woodiel
*Attorney, Agent, or Firm*—Romney Schaap Golant Scillieri & Ashen

[57]         ABSTRACT

An apparatus for controlling the distance between a vehicle to which it is attached and a surface over which the the vehicle may be moving. The apparatus includes a cable and a sheet member which in a first mode is in contact with the surface but in a second mode is out of contact with the surface. Because of design, the sheet member induces a greater tension in the cable when in the second mode than when in the first mode; the increase in tension may be used to actuate a control or indicating devices on the vehicle to maintain the distance within desired limits.

13 Claims, 14 Drawing Figures

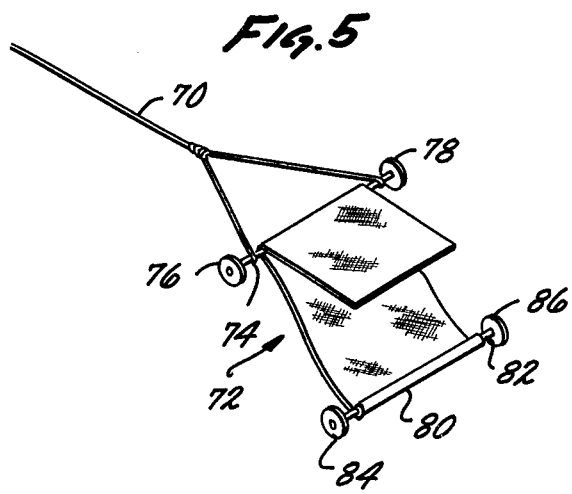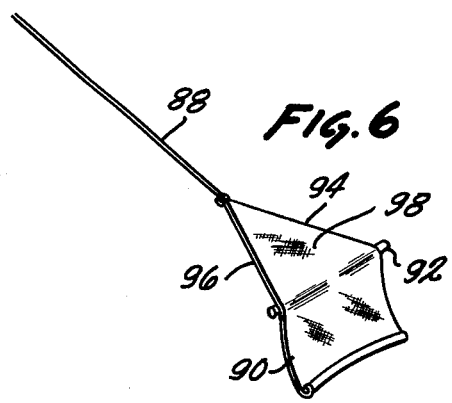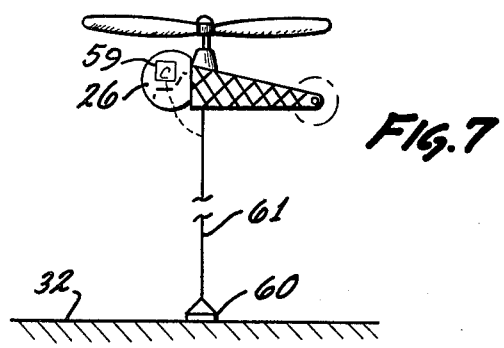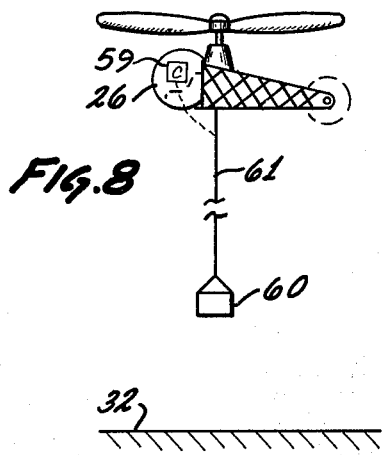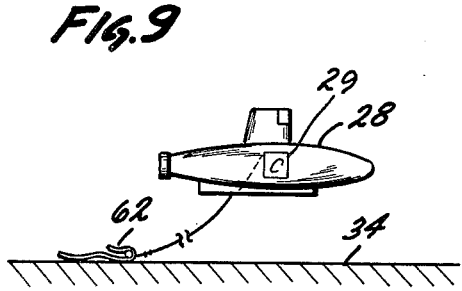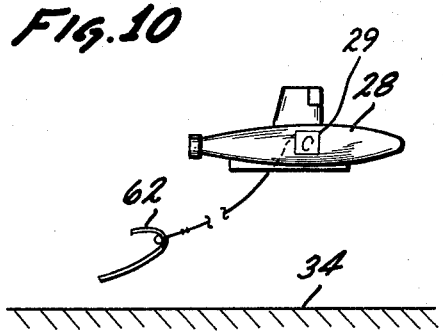

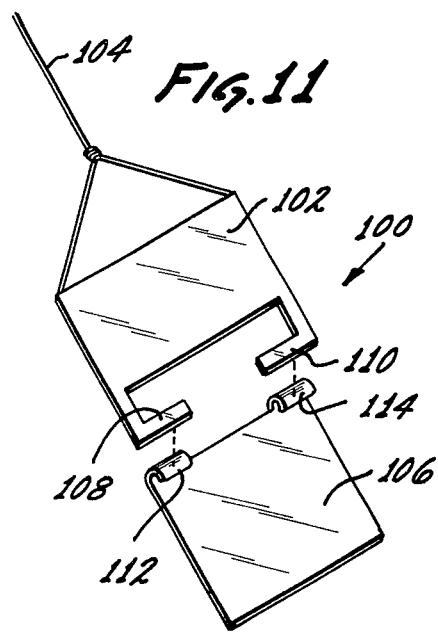
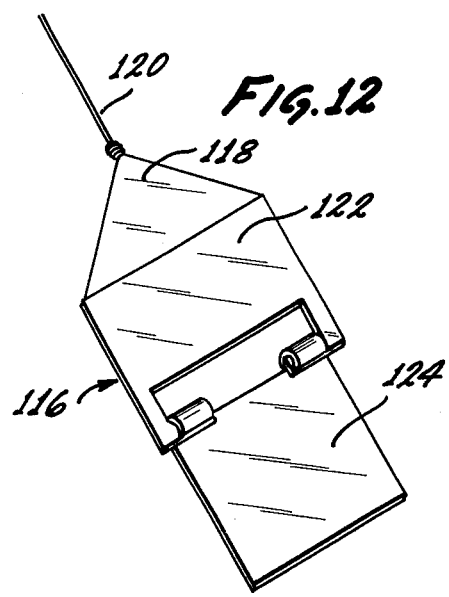
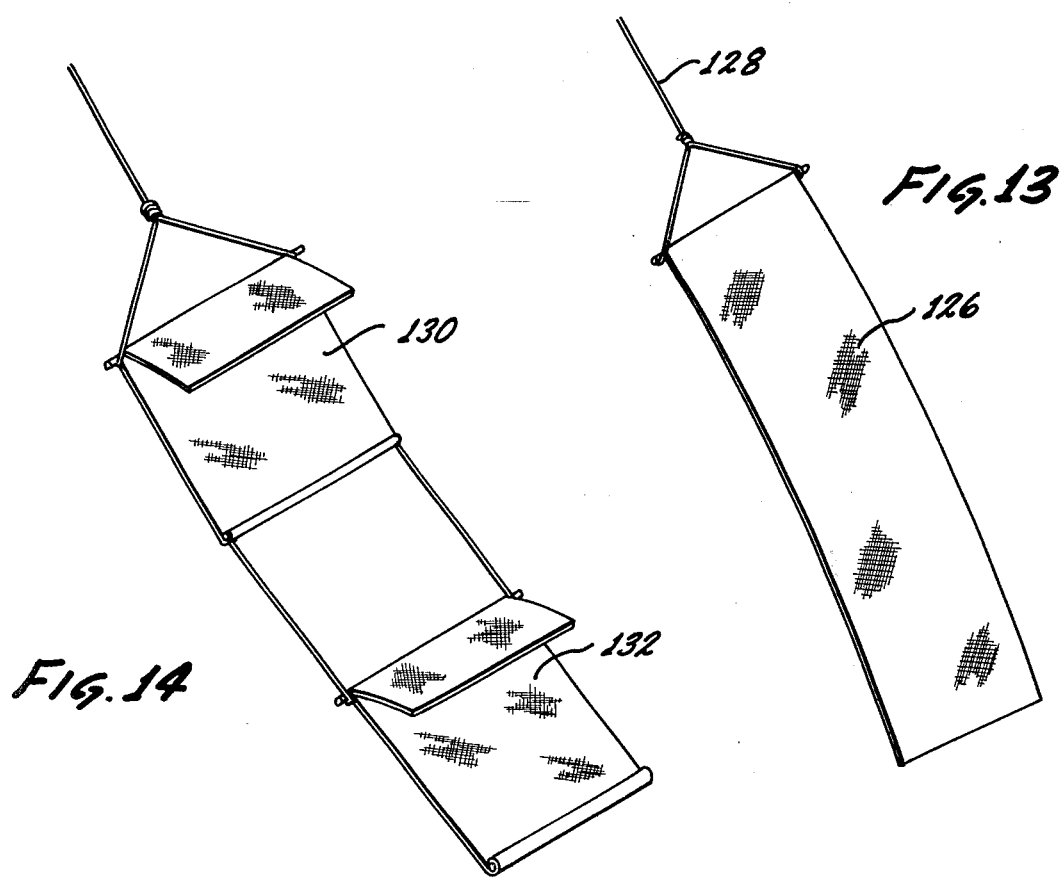

APPARATUS FOR DISTANCE CONTROL

This is a continuation of Ser. No. 351,307, filed Apr. 16, 1973.

BACKGROUND OF THE INVENTION

1. Field of the Invention

The present invention relates to an apparatus for controlling an object's height above or distance from a surface and more particularly to an apparatus that can be used to give an indication of the distance from the ground of an aircraft and cause the aircraft to be controlled within some predetermined distance.

2. Description of the Prior Art

Various means have been developed for controlling the distance between an object or vehicle moving over a surface and the surface. For example, some powered model aircraft have control cables held at one end by an operator while the other end is attached to the flying aircraft thereby limiting the altitude of the aircraft to the length of the control cable. Similar tether devices have been used to limit the height of balloons and helicopters. Being able to control distance would also be very useful in such fields as crop dusting or flight training.

Other altitude control devices include for example, flaps located at the trailing edge of an aircraft's wings, or airbrakes consisting of pivotable flaps attached to the fuselage of the aircraft which are retracted in a position flush with the body of the aircraft during normal flight and are extended outwardly toward a more perpendicular position relative to the fuselage when braking is desired; the extended disposition increases parasite drag on the aircraft which in turn causes the aircraft's flight path to become more downwardly inclined relative to the horizontal.

Yet another form of aircraft control device, directed more toward velocity control, is an attached parachute which is normally folded within the body of an aircraft in normal flight and is extended only upon landing; the parachute's main function upon landing is to shorten the runway necessary to complete landing.

A more recent device used to increase drag of a flying object (which incidentally is not an altitude control device but a velocity control device) is exemplified by U.S. Pat. No. 3,374,973 to D. P. Lokerson. In that patent, a drag device consisting of a plurality of banners are stowed in a vehicle such as a rocket until the remaining portion of the rocket returns to the Earth. At this time, the banners are extended and provide a drag which the patentee believes is "caused primarily by energy transfer resulting from banner flutter and attendant air turbulence." (Column 2, lines 59 through 61). While the devices mentioned are useful in controlling altitude and/or velocity, none has been shown to effectively control the altitude or distance from the ground of an aircraft (or other object) and yet not interfere with the aircraft's maneuverability or performance when the distance from the ground is within a predetermined value or set of values.

Of course any apparatus that is devised would have to be economically feasible to warrant patent protection and to have commercial value.

SUMMARY OF THE INVENTION

The present invention is an apparatus which not only acts in a way to control the distance of an object or vehicle from a surface over which the object is moving and does so effectively and in an economical manner but may also be used to control velocity. The apparatus comprises a cable having first and second ends, the first end being attached to the object and the object being movable in the space over the surface; and a sheet member having a weighted portion attached to the second end of the cable, the sheet member being movable by the object in two different modes, a first mode wherein the sheet member is in contact with the surface, and a second mode wherein the sheet member is not in contact with the surface, the sheet member causing a greater tension in the cable when in the second mode than when in the first mode. Stated in another fashion the tension differential may be described by the relationship:

$$\frac{\text{cable tension in first mode}}{\text{cable tension in second mode}} = \frac{C_{D1} + \frac{2\mu}{\rho V^2}\left(w + \frac{W_T}{S}\right)}{C_{D2}}$$

where $C_{D1}$ = aerodynamic drag coefficient of the sheet member when moved along the surface; $\mu$ = coefficient of friction of the sheet member on the surface; $\rho$ = density of fluid through which the sheet member is moved in the second mode; $V$ = velocity of the sheet member relative to the fluid; $w$ = weight of the sheet member per unit area when not weighted; $W_T$ = weight of the weighted portion; $S$ = sheet member area; $C_{D2}$ = aerodynamic drag coefficient on the sheet member when moved in the second mode.

It is a primary aim of the present invention to provide an apparatus for indicating when the distance from a vehicle or other object to a surface exceeds some critical value.

It is also an aspect of the present invention to provide an apparatus for indicating the distance of an object from a surface and for actuating control devices for keeping the distance to a predetermined value or within a predetermined range of values.

Another object of the present invention is to provide an aapparatus for specifically controlling an aircraft above a ground surface within a range of distances from the ground. When the apparatus are paired, they may be used on an aircraft to provide automatic circling control.

Still another object of the present invention is to provide an apparatus for controlling the velocity of an object moving through a fluid (air or water, for example) over a surface.

It is of course to be understood that while the apparatus is aimed primarily to act in conjunction with an aircraft it can function in an analogous manner with a submerged submarine or with a surface vessel.

Still another aim of the invention is to provide the above-mentioned apparatus as a simply constructed, rugged, and yet inexpensively manufactured device.

Other objects and advantages of the invention will appear from the description taken in conjunction with the accompanying drawings.

BRIEF DESCRIPTION OF THE DRAWINGS

FIG. 5 is a perspective view of another embodiment of a distance control apparatus;

FIG. 6 is a perspective view of yet another embodiment of a distance control apparatus;

FIG. 7 is an elevational view illustrating the apparatus in a first mode used in conjunction with a helicopter;

FIG. 8 is an elevational view illustrating the apparatus shown in FIG. 7 in a second mode;

FIG. 9 is an elevational view illustrating the apparatus in a first mode while being attached to a submerged submarine;

FIG. 10 is an elevational view showing the apparatus of FIG. 9 in a second mode;

FIG. 11 is a perspective view of a metal embodiment of a distance control apparatus;

FIG. 12 is a perspective view of another metal embodiment of a distance control apparatus;

FIG. 13 is a perspective view of yet another embodiment of a distance control apparatus; and FIG. 14 is a perspective view of an embodiment of a distance control apparatus which comprises a cascading of a previously mentioned distance control apparatus.

DESCRIPTION OF THE PREFERRED EMBODIMENTS

Figure 1:
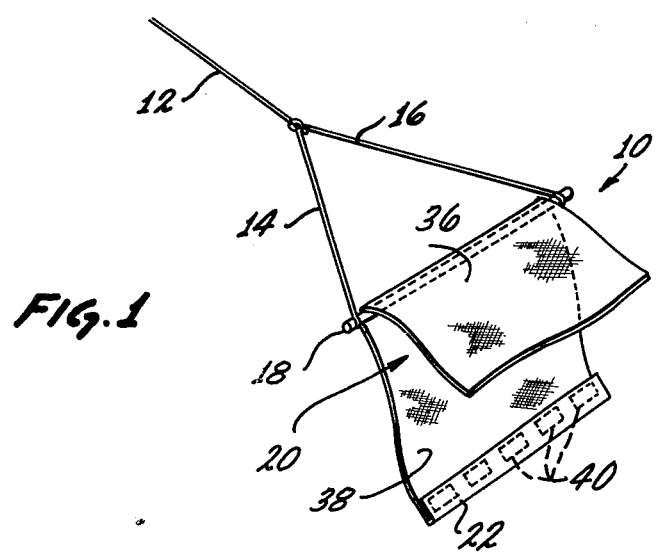
FIG. 1 is a perspective view of one embodiment of distance control apparatus.

While the present invention is susceptible of various modifications and alternative constructions, illustrative embodiments are shown in the drawings and will herein be described in detail. It should be understood however, that it is not the intention to limit the invention to the particular forms disclosed; but on the contrary, the invention is to cover all modifications, equivalences and alternative constructions falling within the spirit and scope of the invention as expressed in the appended claims.

Referring now to FIG. 1, there is illustrated an apparatus 10 for indicating the distance of an object from a surface. The apparatus includes a cable 12 having an end portion which is divided into two parts 14 and 16. The end parts in turn are connected to a rod 18 around which is attached to a sheet member 20 having a weighted end portion 22. As can be readily appreciated, the apparatus is very simple, easily constructed and inexpensive to manufacture and assemble.

Figure 2:
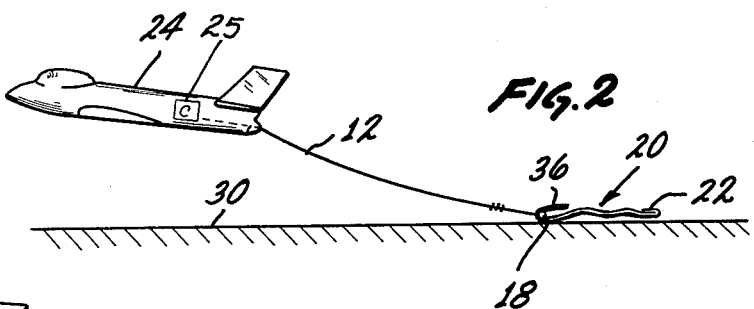
FIG. 2 is an elevational view illustrating the apparatus of FIG. 1 attached to an aircraft in a first mode, being dragged along the ground.

In more detail, the cable 12 is connected to an object which in FIG. 2 is an aircraft 24, in FIG. 7 a helicopter 26, and in FIG. 9 a submarine 28. The object or vehicle is at some position relative to a surface which in FIG. 2 is the ground 30, the ground 32 in FIG. 7 and the ocean bottom 34 in FIG. 9. The cable end parts 14 and 16 are attached to the rod 18 in any convenient manner, the rod being made of wood or metal or any other suitable material such as a synthetic resin.

The sheet member 20 is made of any suitable flexible material such as nylon or mylar. (While it is preferable to have a flexible material it is not required as is exemplified by the embodiments in FIGS. 11 and 12.) The sheet member is comprised of three portions. A first portion 36 is wrapped over the rod 18 from a second portion 38 which in turn is continuous with the third or weighted end portion 22 to define a trailing edge. Weights 40 may be of any suitable material such as metal or may even be comprised of a plurality of rocks.

Figure 3:
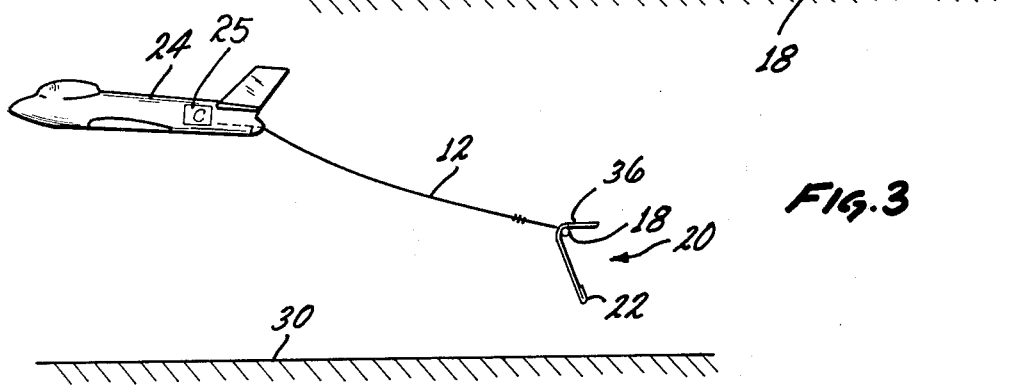
FIG. 3 is an elevational view similar to that shown in FIG. 2 with the apparatus in a second mode in which it is no longer in contact with the ground.

A major advantage of the present invention is its ability to indicate when the distance between an object to which it is attached and a nearby surface exceeds some predetermined value. For example, referring to FIGS. 2 and 3, the aircraft 24, which may be a glider or a powered aircraft, is attached to one end of the cable 12 while the other end is attached to the sheet member 20. In FIG. 2, the sheet member is shown in a first mode; in this mode the sheet member is dragged along the ground surface 30 because of the low altitude of the aircraft relative the ground surface. In FIG. 3, the aircraft is shown at a greater distance from the ground surface so that the sheet member is not in contact with the ground surface. The latter position places the sheet member in its second mode. In the second mode the weighted trailing edge of the sheet member causes the member to droop downwardly at a substantial angle to the horizontal.

A major thrust of the invention as will be explained hereinbelow in greater detail, is that when the sheet member is in its airborne second mode as shown in FIG. 3, the sheet develops more aerodynamic drag and hence a greater tension is developed in the cable 12 than is developed when the sheet member is in its first mode in contact with the ground as shown in FIG. 2. Since there is a distinct difference in tension in the cable between the first and second modes of the sheet member, the cable may be attached to the various controls on the aircraft such control box 25 which may operate the wing flaps or airbrakes to cause the aircraft to adjust its flight path. For example, it may be decided that the aircraft should only fly to some maximum altitude or distance from the ground surface. The cable length is then determined so that when the maximum distance or altitude is reached the sheet member will move from its first mode to its second mode thereby developing a greater tension in the cable; this in turn may cause an appropriate aircraft control to be actuated which alters the flight path of the aircraft causing it to fly within the predetermined maximum altitude or distance.

As a part of the invention a formula has been derived which shows the relationship of the tension in the cable when the sheet member is in its first mode as compared to the tension in the cable when the sheet member is in its second mode. Stated more succinctly the relationship is as follows:

$$\frac{\text{cable tension in first mode}}{\text{cable tension in second mode}} = \frac{C_{D1} + \frac{2\mu}{\rho V^2}\left(w + \frac{W_T}{S}\right)}{C_{D2}}$$

where $C_{D1}$ = aerodynamic drag coefficient of the sheet member when in the first mode;

$\mu$ = coefficient of friction of the sheet member on the surface;

$\rho$ = density of fluid through which the sheet member is moved in the second mode;

$V$ = velocity of the sheet member relative to the fluid;

$w$ = weight of the sheet member per unit area when not weighted;

$W_T$ = weight of the weighted portion;

$S$ = sheet member area;
$C_{D2}$ = aerodynamic drag coefficient of the sheet member when in the second mode.

The derivation of the relationship first included a balance of forces acting on the sheet member in its first mode where it is assumed that the surface along which the sheet member is dragged is a smooth horizontal plane and that the dragging is done at a constant velocity. Among the forces acting on the sheet member are the cable tension, the force of gravity, the aerodynamic drag of the sheet on the ground and the frictional force developed between the ground and the sheet member. Another assumption made is that the angle between the cable and the horizontaal surface is sufficiently small so that the following approximation can be made: sine of the angle equals the angle and cosine of the angle equals one. Then another balance of forces is derived for a steady second mode situation in which the angle of attack of the sheet is defined as the angle between the relative wind and a straight line joining the leading and trailing edges of the sheet, that is a straight line joining the rod 18 with the trailing edge portion of the sheet 22. Once again, it is assumed that the angle between a horizontal reference line and the cable is small so that the cosine of the angle is approximately equal to one. With the assumption that the angle between the reference horizontal line and the towing cable is small as compared to one and with the assumption that the coefficient of friction of the sheet member on the surface is less than one, the balancing of forces leads to the following relationship:

$$\frac{\text{cable tension in first mode}}{\text{cable tension in second mode}} = \frac{D_G + \mu(wS + W_T)}{D_A}$$

where
$D_G$ = aerodynamic drag of the sheet member when it is on the surface;
$D_A$ = aerodynamic drag of the sheet member in the air.
By defining aerodynamic drag coefficients as follows:

$$C_{D1} = \frac{D_G}{1/2 \, \rho V^2 S} \quad \text{and} \quad C_{D2} = \frac{D_A}{1/2 \, \rho V^2 S}$$

the equation may be rewritten in the form mentioned hereinabove:

$$\frac{\text{cable tension in first mode}}{\text{cable tension in second mode}} = \frac{C_{D1} + \frac{2\mu}{\rho V^2}\left(w + \frac{W_T}{S}\right)}{C_{D2}}$$

In order to function as desired the sheet member must create tensions in the cable in the first and second modes such that the following relationship is satisfied:

$$\frac{\text{cable tension in first mode}}{\text{cable tension in second mode}} < 1$$

For purposes of an example analysis, it will be assumed here that the sheet member's dimensions are 2 feet by 2 feet, that the velocity of the towing aircraft is 30 miles per hour or 44 feet per second, that air density equals 0.00238 slugs per cubic foot, that the sheet weight per unit area is equal to 0.016 lbs. per square foot, and that the Reynolds number equals 6400 × 2 × 44 or 562,000; further, it is assumed that the aerodynamic drag on the sheet member in the first mode equals 0.016, (see Hoerner, FLUID-DYNAMIC DRAG [1965] at Sect. 2–6) that the coefficient of friction equals approximately 0.5, that the airborne drag coefficient of the sheet member is similar to that of a rigid plate at the same angle of attack (Hoerner, supra, Sect. 3–16). An optimum weight 40, FIG. 1, in the trailing edge portion 22 of the sheet member is then calculated to derive the maximum increase in tension in the cable between the first and second modes. Satisfactory performance is found to exist when the angle of attack of the sheet member is between 20° and 70° and the weight 40 is between 3.4 lbs. and 14.4 lbs. The optimum weight is about 6 lbs. providing an angle of attack of 45° which creates a cable tension differential of about 5.5 lbs. In other words, there is an increase of cable tension of 5.5 lbs. in the second mode as compared to the first mode. The tension in the cable in the first mode was about 3.8 pounds while the tension in the second mode was about 9.3 lbs. Such an increase in tension has been found more than adequate to actuate various controls which might be used to alter the attitude of the aircraft. It is to be understood that the foregoing analysis included a number of approximations and assumptions and though not exact provides a very practical apparatus which when attached to an aircraft such as a glider, for example, (more specifically a glider as disclosed in my copending patent application entitled "Flexible Wing Aircraft," Ser. No. 318,720) will provide more than sufficient force to operate appropriate controls. It is to be further understood that the increased drag of the sheet member may be used along to alter the flight path of an aircraft simply by this additional force acting on the aircraft.

Figure 4:
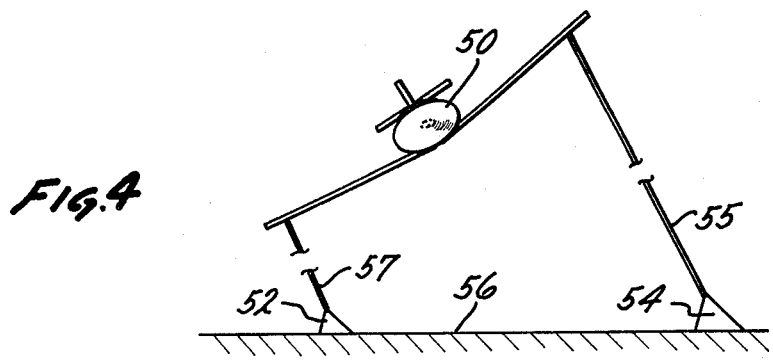
FIG. 4 is a front elevational view of an aircraft having two apparatus, one connected to each wing and suspended from differing cable lengths so as to direct the aircraft in a circle.

Another advantage of the present invention is that it may be used not only to regulate distance or altitude from a surface but also to control an aircraft in other ways; for example, the present invention may be used to control an aircraft to automatically circle over a given location. Referring now to FIG. 4, there is illustrated an aircraft 50 having a pair of sheet members 52 and 54 each attached to a wing of the aircraft. By purposely selecting two different cable lengths, for example, a longer cable 55 for the port wing of the aircraft and a shorter cable 57 for the starboard wing and by having the cables attached to control either trailing edge flaps or lift spoilers fitted to each wing, the aircraft could be made to circle the location indefinitely without its center of gravity exceeding a predetermined maximum altitude. For example, should the sheet member 52 be lifted off the ground 56 because the starboard wing exceeded a predetermined altitude, the increase in tension of the cable could be used to deflect the flap of the starboard wing upwardly so as to roll the aircraft back to its predetermined bank angle, and to cause the center of gravity of the airplane to descend to the desired altitude. Of course, it is assumed that the aircraft 50 is powered and trimmed so that it would not have a tendency to lose altitude when both the sheet members 52 and 54 are in contact with the ground. In a like manner, the sheet member 54 will roll the aircraft in an opposite manner to that just described, back to its predetermined bank angle.

Using a pair of sheet members, an aircraft could also be made to fly within a certain altitude range. This could be accomplished by attaching two sheet members with cables of different lengths. The apparatus with the longer cable would be attached to the aircraft's airbrakes so that an increase in tension would cause the airbrakes to open thereby increasing the drag on the aircraft causing the aircraft to lose altitude. At the same time, the apparatus with the shorter cable would be attached to the throttle in such a manner that a decrease in tension would ccause the throttle to increase power and thereby cause the aircraft to climb. Thus, the shorter apparatus would normally be in the second mode while the longer apparatus would normally be in its first mode. When the apparatus with the shorter cable changed from its airborne second mode to the ground dragging first mode, the resulting decrease in cable tension would actuate the throttle in the desired fashion.

It can now be appreciated that the distance control devices can be used by appropriately connecting them to the throttle, for example, and/or to the airbrakes to provide close restraint on the altitude at which the aircraft will fly. The apparatus can also be used for a velocity controlling device since it may be designed to remain in a first mode providing the air velocity of the craft is below a certain value; however, should the aircraft exceed the predetermined maximum velocity, the aerodynamic drag on the apparatus (even in its ground mode) would become sufficient to pull the cable to an almost horizontal angle. This second mode position would cause an increase in tension which could be used to adjust the controls of the aircraft to, in turn, cause a reduction in speed.

Referring now to FIGS. 7 and 8, there is illustrated the helicopter 26 which is hovering above the ground surface 32. A sheet member 60 attached to the helicopter by a cable 61 could be used to limit the altitude of the helicopter simply by the change in tension of the cable caused by the weight of the sheet member. For example, in the first mode shown in FIG. 7 the weighted end portion of the sheet member would be supported by the ground. However, when the helicopter moves to a higher altitude as shown in FIG. 8, the apparatus would enter into its second mode where the entire weight of the weighted end portion would be borne by the helicopter. If the weight is 6 lbs., then there will be an increase in the tension of the cable of 6 lbs. Once again, the cable may be attached to the appropriate controls 59 of the helicopter to cause it to reduce the lifting forces acting upon it thereby causing a descent.

As shown in FIGS. 9 and 10, a sheet member 62 may be attached to the submarine 28 in order to retain the submarine very close to the ocean bottom 34. Working in a manner analogous to the operation shown in FIGS. 2 and 3 for an aircraft, the sheet member which is shown in its first mode in FIG. 9 would increase tension when the submarine increased its distance from the ocean bottom 34 above some predetermined value. Once again, the cable may be attached to proper controls 29 to orient the submarine downwardly to correct its cruising distance above the ocean floor. As with an aircraft, a plurality of sheet members may be used to keep the submarine within a range of distances above the ocean floor or may be used to keep the submarine above some minimum distance between it and the ocean floor. Further, in an analogous manner, an apparatus may be used on a surface vessel to also indicate when it has moved within some predetermined minimum distance from the ocean bottom thereby preventing an undesirable grounding of the vessel.

It is to be understood that while the cable connecting a sheet member to the object may be directly attached to a control it may also be attached to some power mechanism which operates the proper control, or the cable may be attached to some warning system which merely indicates to an operator the desired information with the operator then taking appropriate action.

In operation in the first or ground mode, the tension induced in the cable 12 by the sheet member 20 as the sheet member is dragged along a surface is less than the tension developed in its airborne or second mode. This is accomplished by designing the sheet member and appropriately weighting it to provide a high aerodynamic drag when the sheet member is airborne while at the same time keeping ground friction to a minimum.

Referring now to FIGS. 5 and 6, there is illustrated two modifications of the apparatus which have the advantage of providing low ground friction. In FIG. 5, the cable 70 is connected to a sheet member 72 by way of a rod 74. At opposite ends of the rod 74 are wheels or rollers 76, 78 while at the trailing edge portion 80 of the sheet member is another rod 82 also having wheels or rollers 84, 86 at the ends of the rod. The purpose of the rollers or wheels is to further reduce ground or surface friction so that the differential between ground tension and airborne tension in the cable is enhanced.

In FIG. 6, a cable 88 is attached to a sheet member 90 by way of a rod 92. As with the FIG. 1 embodiment, the FIG. 6 cable includes two end parts 94 and 96 between which, and between the rod 92 is a triangular sheet of material 98. It has been found that the overlapping first portion 36, FIG. 1, of the sheet member 20 can be eliminated by the triangular sheet. The result will be similar, that is, to reduce the tendency of the apparatus to snag on various types of ground cover.

Referring now to FIGS. 11, 12, 13 and 14, still further variations are illustrated. In FIG. 11, for example, a sheet member 100 is designed in two connectable parts, a leading part 102, which is attached to a cable 104, and a trailing part 106. The parts may be joined simply by providing the leading part with oppositely placed arms 108 and 110 to which hooks 112, 114 of the trailing part can engage. The sheet member may be made of any suitable generally rigid material such as a metal of a thickness so as to be springy. The trailing part may be weighted if not sufficiently heavy to hang inclined to the relative wind; by hanging inclined to the relative wind when airborne a substantial drag is created. As mentioned hereinabove, an inclination or angle of attack (defined as the angle between the relative wind and a straight line joining the leading and trailing edges of the sheet) of about 45° has been found to be optimum. This is in contrast to such prior art as the previously mentioned Lokerson patent where the banners trail substantially parallel to the relative wind, that is, the mean (or time averaged) angle of attack of the banners is substantially zero.

In FIG. 12, a metal sheet member 116 is illustrated having the same construction as the FIG. 11 embodiment except for a triangular part 118 which is attached to a cable 120, and a leading part 122. A trailing part 124 is shown engaged to the leading part as it would be in operation.

Referring to FIG. 13, elongated sheet member 126 is attached to a cable 128. Because of the length and weight of the flexible material the sheet member need not have a weighted end portion in order to hang inclined to the relative wind.

FIG. 14 illustrates the FIG. 1 embodiment in a cascade posture, that is, a first sheet member 130 connected directly to a second sheet member 132. It is of course clear that any one of the previously described embodiments may be placed in cascade so as to provide a more gradual increase in drag as the critical weight is exceeded, in order to obtain a smoother control action.

I claim:
1. An apparatus operatively connected to means for controlling a vehicle movable in a fluid, said apparatus being responsive to the distance from a surface over which said vehicle is movable, comprising:
   a cable extending from said vehicle and having first and second ends, said first end adapted to operate said vehicle controlling means; and
   a sheet member attached to said second end of said cable and movable between two modes, a first low drag mode wherein said sheet member is generally in contact with the surface and generally parallel to a relative wind caused by movement and a higher drag mode wherein said sheet member is spaced from said surface and is inclined to the relative wind,
   whereby a greater tension is developed in said cable when said sheet member is in its second mode than when it is in its first mode.
2. An apparatus as claimed in claim 1, wherein said sheet member is weighted for hanging without substantial fluttering when in said second mode.
3. An apparatus as claimed in claim 1 wherein said sheet member includes a weighted portion.
4. An apparatus as claimed in claim 1 wherein said sheet member is comprised of a rigid material.
5. An apparatus as claimed in claim 1 including a plurality of sheet members in cascade.
6. An apparatus as claimed in claim 1 including a rod positioned transverse to said cable second end and attached thereto; and
   a pair of rotatable elements being attached, one element to each end of said rod.
7. An apparatus as claimed in claim 1 wherein said surface is the ground and said object is an aircraft; and the tension in said cable in said first and second modes is approximated by the relationship:

$$\frac{\text{cable tension, first mode}}{\text{cable tension, second mode}} = \frac{C_{DG} + \frac{2\mu}{\rho V^2}\left(w + \frac{W_T}{S}\right)}{C_{DA}} < 1$$

where
$C_{DG}$ = aerodynamic drag coefficient of the sheet member when moved in contact with the ground;
$\mu$ = coefficient of friction of the sheet member on the ground;
$\rho$ = air density;
$V$ = relative air velocity of the sheet member;
$w$ = sheet member weight per unit area;
$W_T$ = weight of a weighted portion;
$S$ = sheet member area; and
$C_{DA}$ = aerodynamic drag coefficient in air.
8. An apparatus as claimed in claim 7, wherein
$w = 0.016$ pounds/ft$^2$;
$S = 4$ ft$^2$;
$V = 30$ miles/hour;
$W_T = 6$ pounds;
$C_{DG} = 0.016$;
$C_{DA} = 0.8$; and
cable tension in the air mode equals approximately 2.5 times the cable tension in the ground mode.
9. An apparatus as claimed in claim 1 including:
   a rod positioned transverse to said cable second end and attached thereto; and wherein
   said sheet member is wrapped about said rod, said sheet having a weighted trailing edge.
10. An apparatus as claimed in claim 9 wherein said cable second end is divided into two parts, each part attached to a respective end of said rod.
11. An apparatus as claimed in claim 10 wherein said cable second end is divided into two parts; and including
   a sheet portion, triangular in form, attached to the divided second end of said cable.
12. An apparatus operatively connected to means for controlling a vehicle movable in a fluid, said apparatus being responsive to the distance from a surface over which said vehicle is movable, comprising:
   a cable extending from said vehicle and having first and second ends, said first end adapted to operate said vehicle controlling means; and
   a sheet member attached to said second end of said cable and movable between first and second modes, wherein said first mode said sheet member is in contact with said surface and in said second mode said sheet member is movable through said fluid at a distance from said surface, said sheet member inducing a varying tension in said cable according to the relationship $$\frac{\text{cable tension in first mode}}{\text{cable tension in second mode}} = \frac{C_{D1} + \frac{2\mu}{\rho V^2}\left(w + \frac{W_T}{S}\right)}{C_{D2}}$$

where
$C_{D1}$ = the aerodynamic drag coefficient of the member when dragged along the surface;
$\mu$ = the coefficient of friction of the member on the surface;
$\rho$ = the density of fluid through which the member is dragged in the second mode;
$V$ = the velocity of the member relative to the fluid;
$w$ = the weight of the member per unit area when not weighted;
$W_T$ = weight of a weighted portion of the member;
$S$ = member area;
$C_{D2}$ = the aerodynamic drag coefficient of the member when in the second mode,
whereby said varying tension actuates said controlling means.
13. An apparatus included within a vehicle system movable in a fluid for changing the path of travel of said system by changing the drag of said system, said apparatus being responsive to the distance from a surface over which said vehicle system is movable, comprising:
   a cable extending from said vehicle and having first and second ends, said first end being connected to said vehicle; and
   a sheet member attached to said second end of said cable and movable between two modes, a first low-drag mode wherein said sheet member is generally in contact with the surface and generally parallel to a relative wind and a second higher drag mode wherein said sheet member is spaced from said surface and is inclined to the relative wind.

* * * * *